(12) United States Patent
Jarzebinski

(10) Patent No.: US 11,213,748 B2
(45) Date of Patent: Jan. 4, 2022

(54) CONTENT STREAMING WITH GAMEPLAY LAUNCH

(71) Applicant: SONY INTERACTIVE ENTERTAINMENT INC., Tokyo (JP)

(72) Inventor: Alexander Jarzebinski, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 11 days.

(21) Appl. No.: 16/679,795

(22) Filed: Nov. 11, 2019

(65) Prior Publication Data

US 2021/0129023 A1 May 6, 2021

Related U.S. Application Data

(60) Provisional application No. 62/929,638, filed on Nov. 1, 2019.

(51) Int. Cl.
| | |
|---|---|
| *A63F 13/48* | (2014.01) |
| *A63F 13/86* | (2014.01) |
| *A63F 13/355* | (2014.01) |

(52) U.S. Cl.
CPC ............ *A63F 13/48* (2014.09); *A63F 13/355* (2014.09); *A63F 13/86* (2014.09)

(58) Field of Classification Search
CPC ......... A63F 13/48; A63F 13/355; A63F 13/86
USPC .......................................................... 463/42
See application file for complete search history.

(56) References Cited

U.S. PATENT DOCUMENTS

| | | | |
|---|---|---|---|
| 8,448,095 B1 | 5/2013 | Haussila et al. | |
| 8,764,555 B2* | 7/2014 | Quan | A63F 13/49 463/24 |
| 9,168,460 B2 | 10/2015 | Pearce | |
| 9,381,425 B1 | 7/2016 | Curtis et al. | |
| 9,795,879 B2* | 10/2017 | Colenbrander | A63F 13/49 |

(Continued)

FOREIGN PATENT DOCUMENTS

| | | |
|---|---|---|
| KR | 2018-0094833 | 8/2018 |
| WO | WO 2009/094611 | 7/2009 |

(Continued)

OTHER PUBLICATIONS

PCT Application No. PCT/US2019/062602 International Search Report and Written Opinion dated Feb. 14, 2020.

(Continued)

*Primary Examiner* — Allen Chan
(74) *Attorney, Agent, or Firm* — Polsinelli LLP

(57) ABSTRACT

A system and method for launching gameplay from streaming content is provided. Information regarding media content may be stormed in memory. Such media content may have at least one or more trigger points and each trigger point may be associated with a set of game data specific to a gameplay scene within an interactive title. The media content may be streamed to a user device over a communication network. A selection of one of the at least one or more trigger points may be received over the communication network from the user device. Identifying the set of game data associated with the selected trigger point may be identified and the interactive title for gameplay may be launched by the user device based on the identified set of game data associated with the selected trigger point.

30 Claims, 5 Drawing Sheets

(56) References Cited

U.S. PATENT DOCUMENTS

| | | |
|---|---|---|
| 10,109,003 B1 | 10/2018 | Jenkins et al. |
| 10,564,820 B1 | 2/2020 | Cabanero et al. |
| 10,843,085 B2 | 11/2020 | Stephens |
| 10,881,962 B2 | 1/2021 | Stephens |
| 11,080,748 B2 | 8/2021 | Stephens |
| 2004/0021684 A1 | 2/2004 | Millner |
| 2008/0262858 A1 | 10/2008 | Broady et al. |
| 2009/0170609 A1 | 7/2009 | Kang et al. |
| 2009/0276713 A1 | 11/2009 | Eddy |
| 2010/0070613 A1 | 3/2010 | Chen et al. |
| 2011/0067061 A1 | 3/2011 | Karaoguz et al. |
| 2011/0113149 A1 | 5/2011 | Kaal |
| 2011/0314029 A1 | 12/2011 | Fischer et al. |
| 2011/0319229 A1 | 12/2011 | Corbalis et al. |
| 2012/0004956 A1 | 1/2012 | Huston et al. |
| 2012/0094762 A1 | 4/2012 | Khan |
| 2012/0206574 A1 | 8/2012 | Shikata et al. |
| 2012/0317198 A1 | 12/2012 | Patton et al. |
| 2013/0064527 A1 | 3/2013 | Maharajh et al. |
| 2013/0086484 A1 | 4/2013 | Antin et al. |
| 2013/0165234 A1 | 6/2013 | Hall et al. |
| 2013/0212342 A1 | 8/2013 | McCullough et al. |
| 2013/0244785 A1 | 9/2013 | Gary |
| 2014/0129322 A1 | 5/2014 | George et al. |
| 2014/0199045 A1 | 7/2014 | Lee et al. |
| 2014/0204014 A1 | 7/2014 | Thorn et al. |
| 2014/0206456 A1 | 7/2014 | Koplar |
| 2014/0228112 A1 | 8/2014 | Laakkonen et al. |
| 2014/0243098 A1 | 8/2014 | Yong et al. |
| 2015/0026728 A1 | 1/2015 | Carter et al. |
| 2015/0081777 A1 | 3/2015 | Laine et al. |
| 2015/0142799 A1 | 5/2015 | Eronen et al. |
| 2015/0224396 A1 | 8/2015 | Okada |
| 2015/0245084 A1 | 8/2015 | Downing et al. |
| 2015/0296250 A1 | 10/2015 | Casper |
| 2015/0331856 A1 | 11/2015 | Choi et al. |
| 2015/0381689 A1 | 12/2015 | Ganesh et al. |
| 2016/0005326 A1 | 1/2016 | Syrmis et al. |
| 2016/0029153 A1 | 1/2016 | Linn et al. |
| 2016/0078471 A1 | 3/2016 | Hamedi |
| 2016/0147890 A1 | 5/2016 | Wissner et al. |
| 2016/0149956 A1 | 5/2016 | Birnbaum et al. |
| 2016/0277349 A1 | 9/2016 | Bhatt et al. |
| 2016/0350813 A1 | 12/2016 | Balasubramanian et al. |
| 2017/0050111 A1 | 2/2017 | Perry et al. |
| 2017/0087460 A1 | 3/2017 | Perry |
| 2017/0126757 A1 | 5/2017 | Kuo et al. |
| 2017/0188116 A1 | 6/2017 | Major et al. |
| 2017/0301041 A1 | 10/2017 | Schneider |
| 2017/0339093 A1 | 11/2017 | Pesavento et al. |
| 2017/0354888 A1* | 12/2017 | Benedetto ............... A63F 13/63 |
| 2018/0001216 A1 | 1/2018 | Bruzzo et al. |
| 2018/0014077 A1 | 1/2018 | Hou et al. |
| 2018/0021684 A1* | 1/2018 | Benedetto ............... A63F 13/49 463/24 |
| 2018/0033250 A1 | 2/2018 | O'Heeron et al. |
| 2018/0101614 A1 | 4/2018 | Kuipers et al. |
| 2018/0126279 A1 | 5/2018 | Stelovsky et al. |
| 2018/0192142 A1 | 7/2018 | Paul |
| 2018/0318708 A1 | 11/2018 | Rom et al. |
| 2018/0343505 A1 | 11/2018 | Loheide et al. |
| 2018/0359477 A1 | 12/2018 | Yang |
| 2019/0208242 A1 | 7/2019 | Bates et al. |
| 2019/0246149 A1 | 8/2019 | Reza et al. |
| 2019/0282906 A1 | 9/2019 | Yong |
| 2019/0297376 A1 | 9/2019 | McCarty et al. |
| 2020/0114267 A1 | 4/2020 | Sakurai |
| 2020/0147489 A1 | 5/2020 | Mahlmeister et al. |
| 2020/0184041 A1 | 6/2020 | Andon et al. |
| 2020/0188781 A1 | 6/2020 | Stephens |
| 2020/0188792 A1 | 6/2020 | Stephens |
| 2020/0188794 A1 | 6/2020 | Stephens |
| 2020/0188796 A1 | 6/2020 | Stephens |
| 2020/0188800 A1 | 6/2020 | Stephens |
| 2020/0192929 A1 | 6/2020 | Stephens |
| 2020/0193476 A1 | 6/2020 | Stephens |
| 2020/0193477 A1 | 6/2020 | Stephens |
| 2021/0077907 A1 | 3/2021 | Stephens |

FOREIGN PATENT DOCUMENTS

| | | |
|---|---|---|
| WO | WO 2014/047490 | 3/2014 |
| WO | WO 2017/182642 | 10/2017 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |
| WO | WO 2021/086561 | 5/2021 |

OTHER PUBLICATIONS

PCT Application No. PCT/US2019/062606 International Search Report and Written Opinion dated Jan. 30, 2020.
PCT Application No. PCT/US2019/062613 International Search Report and Written Opinion dated Feb. 3, 2020.
PCT Application No. PCT/US2019/062626 International Search Report and Written Opinion dated Jan. 29, 2020.
PCT Application No. PCT/US2020/054603 International Search Report and Written Opinion dated Jan. 28, 2021.
U.S. Appl. No. 16/220,397 Office Action dated Sep. 25, 2020.
U.S. Appl. No. 16/359,160 Office Action dated Nov. 13, 2020.
U.S. Appl. No. 16/220,443 Office Action dated Oct. 19, 2020.
U.S. Appl. No. 16/379,683 Office Action dated Nov. 6, 2020.
U.S. Appl. No. 16/220,460 Office Action dated Jan. 28, 2020.
U.S. Appl. No. 16/380,760 Office Action dated Mar. 6, 2020.
U.S. Appl. No. 16/220,465 Final Office Action dated Dec. 24, 2020.
U.S. Appl. No. 16/220,465 Office Action dated Jun. 15, 2020.
U.S. Appl. No. 16/358,546 Final Office Action dated Jan. 27, 2021.
U.S. Appl. No. 16/358,546 Office Action dated May 20, 2020.
U.S. Appl. No. 17/102,881, Mischa Stephens, Media-Activity Binding and Content Blocking, filed Nov. 24, 2020.
PCT/US20/54603, Content Streaming With Gameplay Launch, filed Oct. 7, 2020.
U.S. Appl. No. 16/885,629, Dustin S. Clingman, Media-Object Binding Displaying Real-Time Play Data for Live-Streaming Media, filed May 28, 2020.
U.S. Appl. No. 16/885,653, Dustin S. Clingman, Media-Object Binding for Predicting Performance in a Media, filed May 28, 2020.
U.S. Appl. No. 16/885,641, Dustin S. Clingman, Media-Object Binding for Dynamic Generation and Displaying of Play Data Associated With Media, filed May 28, 2020.
U.S. Appl. No. 16/359,160 Final Office Action dated Mar. 12, 2021.
U.S. Appl. No. 16/220,443 Final Office Action dated Apr. 13, 2021.
U.S. Appl. No. 16/379,683 Final Office Action dated May 7, 2021.
U.S. Appl. No. 16/358,546 Final Office Action dated Nov. 1, 2021.
Li et al., "Distributed Multimedia Systems", IEEE, Jul. 1997, retrieved on [Feb. 7, 2021], Retrieved from the internet <URL: https://citeseerx.ist.psu.edu/viewdoc/download?doi=10.1.1.128.9759 &rep1&type=pdf>.
PCT Application No. PCT/US2019/062602 International Preliminary Report on Patentability dated Jun. 8, 2021.
PCT Application No. PCT/US2019/062606 International Preliminary Report on Patentability dated Jun. 8, 2021.
PCT Application No. PCT/US2019/062613 International Preliminary Report on Patentability dated Jun. 8, 2021.
PCT Application No. PCT/US2019/062626 International Preliminary Report on Patentability dated Jun. 8, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
U.S. Appl. No. 16/359,160 Office Action dated Jul. 12, 2021.
U.S. Appl. No. 16/220,443 Office Action dated Aug. 6, 2021.
U.S. Appl. No. 16/220,465 Office Action dated Jul. 26, 2021.
U.S. Appl. No. 16/358,546 Office Action dated Jun. 23, 2021.

* cited by examiner

… (1)

CONTENT STREAMING WITH GAMEPLAY LAUNCH

CROSS-REFERENCE TO RELATED APPLICATION

This application claims benefit from U.S. Provisional Application No. 62/929,638, filed Nov. 1, 2019, which is herein incorporated by reference in its entirety.

BACKGROUND OF THE INVENTION

1. Field of the Invention

The present technology pertains to content streaming. More specifically, the present technology may include content streaming with gameplay launch at a media scene of the streamed content.

2. Description of the Related Art

Platform-based gameplay (e.g., Sony PlayStation®) may include a variety of content (e.g., a game, an interactive movie, etc.) to play, interact with other users, or otherwise interact with the selected content in different ways. Such gameplay may be combined with cut-scenes to create a "movie" version of a game title. Such movie version of the game title may be popular amongst users who do not have time to play the game title, but still desires to experience the story of the game title or users who have completed the game title, but wish to re-watch the story.

Due to an ever-increasing amount of media content, unique user experiences with such media content may be crucial to maintaining or increasing user engagement with a platform or a specific game title. Presently available ways for streaming such media content includes conventional means for online or offline streaming, which may overwhelm a user as thousands of media content are available for viewing.

There is, therefore, a need in the art for systems and methods for providing content streaming with gameplay launch for an interactive user experience with conventional media content.

SUMMARY OF THE PRESENTLY CLAIMED INVENTION

Embodiments of the present invention include systems and methods for launching gameplay from streaming content. Information regarding media content may be stormed in memory. Such media content may have at least one or more trigger points and each trigger point may be associated with a set of game data specific to a gameplay scene within an interactive title. The media content may be streamed to a user device over a communication network. A selection of one of the at least one or more trigger points may be received over the communication network from the user device. The set of game data associated with the selected trigger point may be identified and the interactive title for gameplay may be launched by the user device based on the identified set of game data associated with the selected trigger point.

Various embodiments may include methods for launching gameplay from streaming content. Such methods may include storing information regarding media content in memory. Such media content may have at least one or more trigger points. Each trigger point may be associated with a set of game data specific to a gameplay scene within an interactive title. Such methods may include streaming the media content over a communication network to a user device. Such methods may include receiving a selection of one of the at least one or more trigger points over the communication network from the user device. Such methods may include identifying the set of game data associated with the selected trigger point. Such methods may include launching the interactive title for gameplay by the user device based on the identified set of game data associated with the selected trigger point.

Additional embodiments may include systems for launching gameplay from streaming content. Such systems may include memory that stores information regarding media content. Such media content may have at least one or more trigger points. Each trigger point may be associated with a set of game data specific to a gameplay scene within an interactive title. Such systems may include a server that streams the media content over a communication network to a user device. Such server may receive a selection of one of the at least one or more trigger points from the user device. Such systems may include a processor that executes instructions stored in the memory. Execution of the instructions by the processor may identify the set of game data associated with the selected trigger point. Execution of the instructions by the processor may launch the interactive title for gameplay on the user device based on the identified set of game data associated with the selected trigger point.

Further embodiments include non-transitory computer-readable storage media having embodied thereon a program executable by a processor to perform a method for launching gameplay from streaming content as described above.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for launching gameplay from streaming content. Information regarding media content may be stored in memory. Such media content may have at least one or more trigger points and each trigger point may be associated with a set of game data specific to a gameplay scene within an interactive title. The media content may be streamed to a user device over a communication network. A selection of one of the at least one or more trigger points may be received over the communication network from the user device. Identifying the set of game data associated with the selected trigger point may be identified and the interactive title for gameplay may be launched by the user device based on the identified set of game data associated with the selected trigger point.

Figure 1:
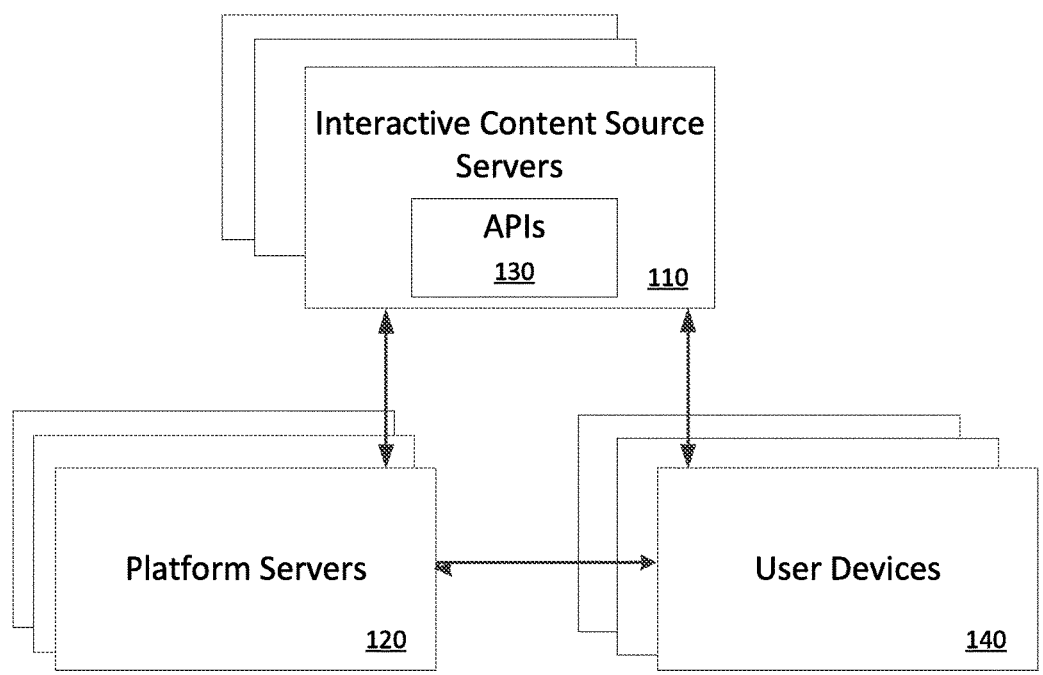
FIG. 1 illustrates a network environment in which a system for launching gameplay from streaming content may be implemented.

FIG. 1 illustrates a network environment 100 in which a system for launching gameplay from streaming content may be implemented. The network environment 100 may include one or more interactive content source servers 110 that provide interactive content (e.g., video games, interactive video, etc.), platform servers 120, and user devices 140.

Interactive content source servers 110 may maintain and host interactive content titles (e.g., video games, interactive books, interactive movies, etc.) available for play to a user device 140 over a communication network. Such interactive content servers 110 may be implemented in the cloud (e.g., one or more cloud servers). Each interactive content title may include one or more activities available within the content title. The one or more activities may be playable by a single user or by multiple users. Each activity may include an activity identifier. In one example, the interactive content title is a video game title having different modes of competitive gameplay available within that game title. In another example, the interactive content title is another video game title having an interactive storyline for single user play.

The platform server 120 may be responsible for communicating with the different interactive content source servers 110 in order to provide gameplay launch from streaming content. Such server 120 may be implemented in the cloud (e.g., one or more cloud servers). The interactive content source servers 110 may communicate with multiple platform servers 120. The platform server 120 may carry out instructions, for example, for storing information regarding media content in memory. Such media content may have at least one or more trigger points and each trigger point may be associated with a set of game data specific to a gameplay scene within an interactive title. The platform server 120 may also carry out instructions, for example, for receiving information regarding a current user status for each activity. The platform server 120 may also carry out instructions, for example, for streaming the media content over a communication network to a user device. The platform server 120 may also carry out instructions, for example, for receiving a selection of one of the at least one or more trigger points over the communication network from the user device. The platform server 120 may also carry out instructions, for example, for identifying the set of game data associated with the selected trigger point. The platform server 120 may also carry out instructions, for example, for launching the interactive title for gameplay on the user device based on the identified set of game data associated with the selected trigger point.

The interactive content titles and their corresponding one or more activities and associated one or more actions may be provided through an application programming interface (API) 130, which allows various types of interactive content sources server 110 to communicate with different platform servers 120 and different user devices 140. API 130 may be specific to the particular computer programming language, operating system, protocols, etc., of the interactive content source servers 110 providing the interactive content titles, the platform servers 120 providing the associated templates, and user devices 140 receiving the same. In the network environment 100 that includes multiple different types of interactive content source servers 110 (or platform servers 120 or user devices 140), there may likewise be a corresponding number of APIs 130.

The user device 140 may include a plurality of different types of computing devices. For example, the user device 140 may include any number of different gaming consoles, mobile devices, laptops, and desktops. Such user devices 140 may also be configured to access data from other storage media, such as, but not limited to memory cards or disk drives as may be appropriate in the case of downloaded services. Such devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 5.

Figure 2:
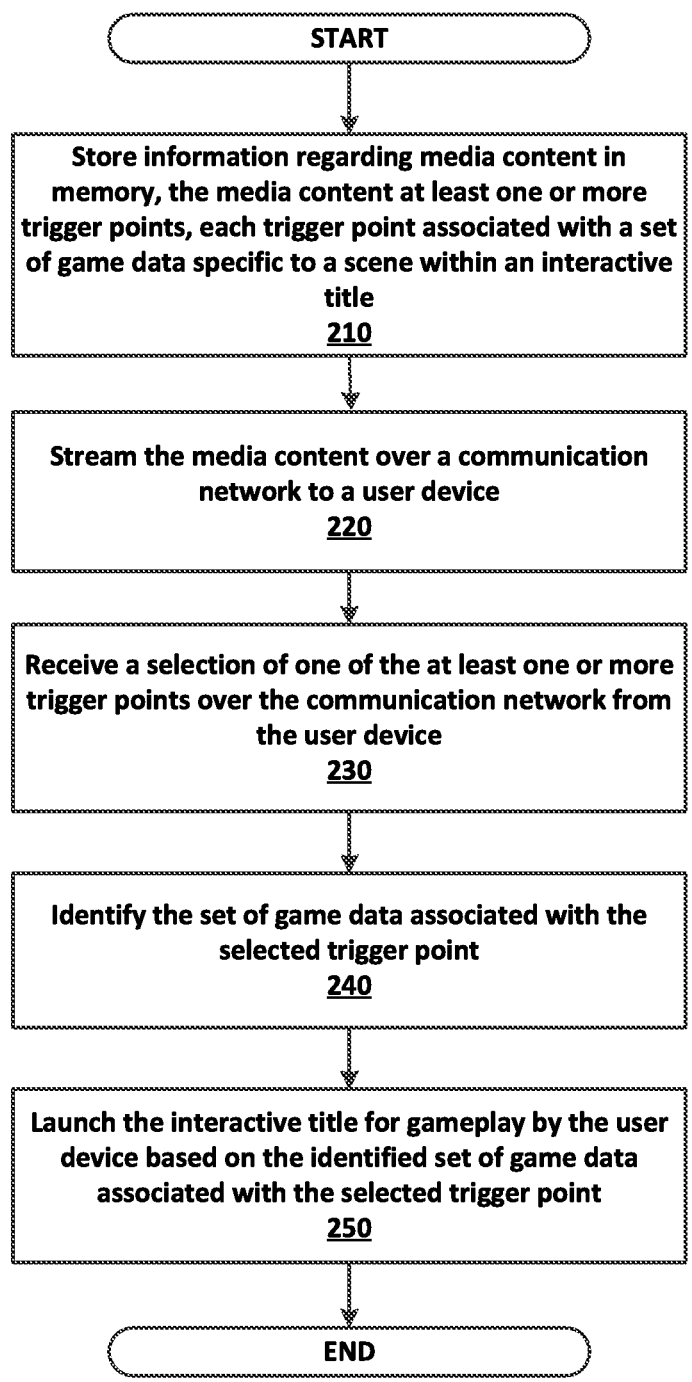
FIG. 2 is a flowchart illustrating an exemplary method for launching gameplay from streaming content.

FIG. 2 is a flowchart illustrating an exemplary method 200 for making launching gameplay from streaming content. The method 200 of FIG. 2A may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 2 are performed in the cloud). The steps identified in FIG. 2 (and the order thereof) are exemplary and may include various alternatives, equivalents, or derivations thereof including but not limited to the order of execution of the same.

In step 210, information regarding media content is stored in memory by the platform servers 120 and/or interactive content source servers 110. Such media content may have at least one or more trigger points and each trigger point may be associated with a set of game data specific to a gameplay scene within an interactive title. Each set of game data may include an activity identifier to identify an activity associated with the gameplay scene and may include data regarding a game character (e.g., skill level, items, weapons, mounts, etc.) and a status of the game character (e.g., level of health, level of mana, etc.) within the gameplay scene. Such media content may also include a plurality of timestamps and each timestamp may correspond to a media content scene within the media content. Similarly, such interactive title may include a plurality of timestamps and each timestamp may correspond to a gameplay scene and/or an activity within the interactive title. The plurality of timestamps of the media content may correspond to the plurality of timestamps of the interactive title.

The media content may be provided by a user (e.g., User Generated Content), a platform (e.g., Sony PlayStation®), a publisher of the interactive title, or a third party publisher. Media content may include previous gameplay, cut scenes, or content provided by a publisher. In some examples, such gameplay and cut scenes are combined in line with a storyline of the interactive title to create a "movie" version of the interactive title. The media content may include a linear storyline or a storyline containing multiple storylines and endings. The at least one or more trigger points within the media content may correspond to battles, bosses, alternative endings, alternative storylines, or quests integral to the storyline, thereby allowing a user to experience and play portions of the interactive title most important to the storyline. The at least one or more trigger points may also correspond to alternative loadouts, talent or skill trees, equipment, inventory, levels, builds, and/or other player configurations.

The at least one or more trigger points of media content provided by the user or peers may correspond to user save points or check points within the associated interactive title. In other words, as the user saves during gameplay of the interactive title, the save point is recorded and associated with a trigger point. Similarly, each set of game data at each trigger point may be based on user gameplay data captured at the user save point. For example, data about the game character and the status of the game character may be based on the user's game character at the user save point.

The at least one or more trigger points of media content provided by the platform, publisher, or third party publisher or may otherwise be determined by platform, publisher, or third party publisher. For example, the platform, publisher, or third party publisher may associate each trigger point with a start of an activity (e.g., a battle, a boss, a quest, a mission, etc.). In other examples, each trigger point may correspond to alternative loadouts, talent or skill trees, equipment, inventory, levels, builds, and other player configurations. Similarly, each set of game data at each trigger point may be determined by the platform, publisher, or third party publisher. For example, the platform, publisher, or third party publisher may equip the game character with high, low, or between high and low quality items and weapons and/or set the game character at the highest, lowest, or between the highest and lowest skill level possible.

In step 220, the media content may be streamed over a communication network by the platform servers 120 and/or interactive content source servers 110 to the user device 140. In other examples, the media content may be locally saved on the platform server 120 or the user device 140. The media content may be streamed when the user device 140 is online or offline and/or when the platform server 120 is online or offline. Streaming the media content may further include displaying a notification when play of the streamed media content reaches one of the at least one or more trigger points. A user may select to play the game at the media content scene or may select to resume streaming of the media content. The notification may also be displayed for a short duration and automatically resume streaming of the media content if a selection is not received. A user may also manually select a trigger point without the notification during streaming or may pause streaming to select a trigger point. Such media content may be streamed with standard streaming controls (e.g., pause, play, fast forward, rewind, selection of any media content scene to begin streaming, selection of chapters) and additional controls to launch gameplay, described and shown relative to FIG. 4.

In step 230, a selection of one of the at least one or more trigger points may be received by the platform servers 120 and/or interactive content source servers 110 over the communication network from the user device 140. In some examples, receiving the selection of one of the at least one or more trigger points includes receiving input (e.g., input from a controller or a voice input) during play of the streamed media content at the user device 140. Such input may specify a media location associated with the selected trigger point. The media location may also include a timestamp from the plurality of timestamps.

In step 240, the set of game data associated with the selected trigger point may be identified by the platform servers 120 and/or interactive content source servers 110. In some examples, identifying the set of game data associated with the selected trigger point includes matching the media location of the selected trigger point to a corresponding gameplay location of the gameplay scene within the interactive title. The gameplay location may be a location in the gameplay closest to the corresponding media location. For example, the gameplay location may be a start of an activity nearest the corresponding media location. In other examples, identifying the set of game data identifies the activity associated with an activity identifier received with the selected trigger point. In yet other examples, such matching of the media location to the gameplay location may include matching the timestamp of the media location to a timestamp of the gameplay location.

In step 250, the interactive title may be launched for gameplay by the user device 140 based on the identified set of game data associated with the selected trigger point. Launching the gameplay may further include launching the activity associated with the activity identifier of the identified set of game data. In some examples, the interactive title is launched at the matched gameplay location or matched timestamp as described above. Launching the interactive title may include having the interactive title suspended in a background of the user device 140 or platform server 120, such that the interactive title is already booted and ready for play. Launching the interactive title from a suspended interactive title can open the suspended interactive title and navigate to the selected gameplay scene based on the identified set of game data. Alternatively, launching the interactive title may first launch the interactive title, and then navigate to the selected gameplay scene based on the identified set of game data. Further, launching the interactive title for gameplay may be performed when the user device 140 and/or the platform server 120 are both online or offline or when one of the user device 140 and/or the platform server 120 are online and the other is offline. In another example, the media content may be streamed on a mobile device, which may send instructions to a console to launch the interactive title when a trigger point is received. In the same example, the interactive title may be launched and ready for gameplay when the user switches from the mobile device to the console.

The gameplay may end either by the user reaching a predetermined end point of the gameplay or by receiving a selection from the user to end gameplay. The predetermined end point may correspond to the end of the activity. When gameplay ends, an end gameplay location of the gameplay may be identified. The end gameplay location may correspond to the received selection from the user to end gameplay or the predetermined end point of the gameplay. The end gameplay location may be matched to another media location and streaming of the media content may resume at the another media location. Matching the end gameplay location to the another media location may include matching a timestamp of the end gameplay location to a timestamp of the another media location. In other examples, the streaming of the media content may resume at another media location based on a game state status. For example, a character of the user may die during a battle and change the game state status from active to inactive and may resume streaming of the media based on the inactive game state status. Such return to the streaming media from gameplay creates a seamless user transition from gameplay to the streaming media and together with the steps described above, creates a unique user experience of transitioning between the streaming media to gameplay and vice versa for seamless interaction.

Figure 3:
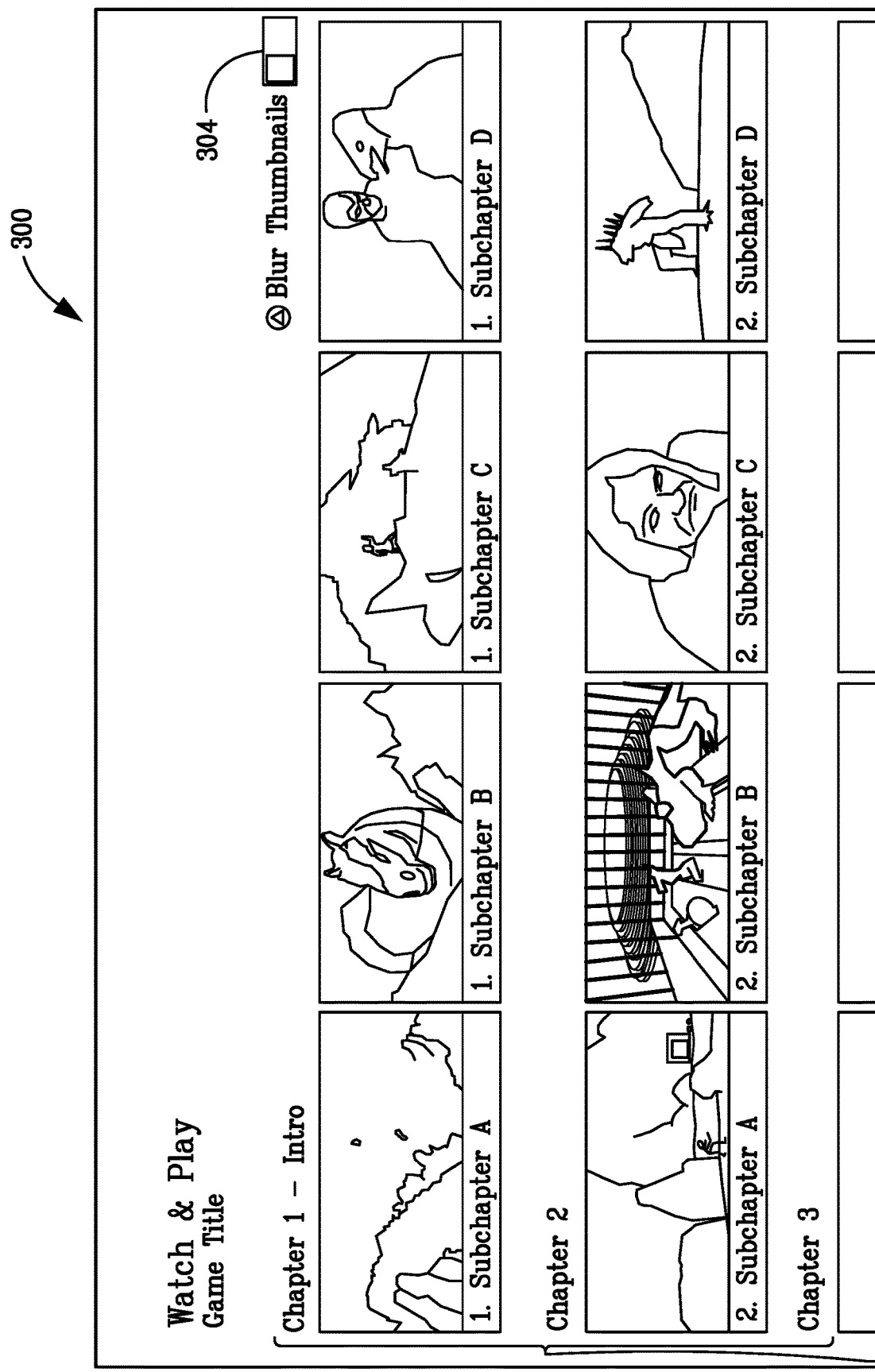
FIG. 3 illustrates an exemplary user interface for displaying a media content scene list of the streaming content.
Figure 4:
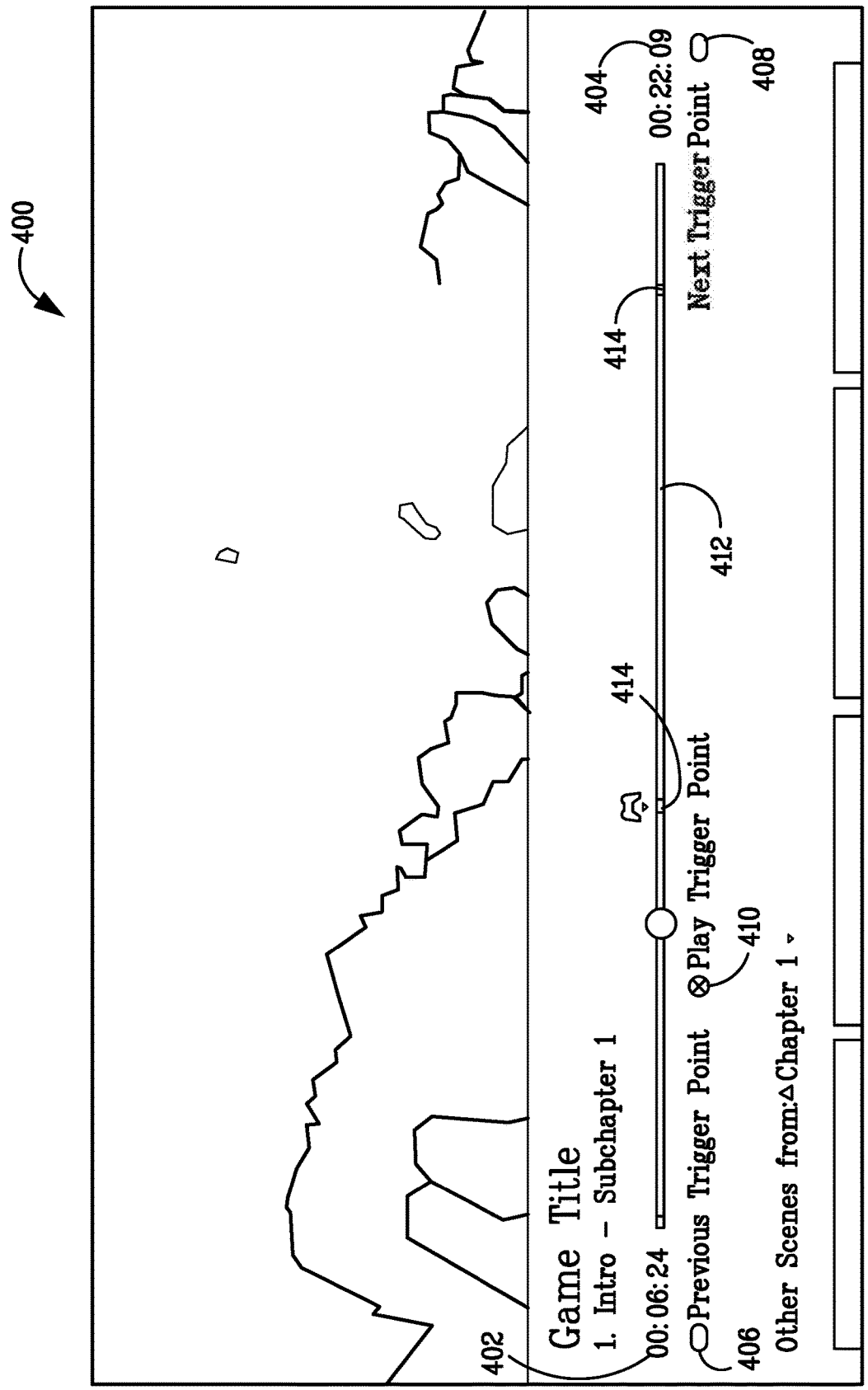
FIG. 4 illustrates an exemplary user interface for content information and user controls provided during streaming of the content.

FIG. 3 illustrates an exemplary user interface 300 for a media content scene list 302 of the interactive title and FIG. 4 illustrates an exemplary user interface 400 for user controls 402 provided during streaming content. Such user interfaces 300, 400 illustrate a user experience provided by the systems and methods described above. The user interface 300 provides a media content scene list 302 of the media content and may provide a switch 304 to deactivate media content scenes 304 (e.g., block, blur, hide, grey out, or otherwise make media content scenes 304 inaccessible). The media content scenes 304 may also be automatically deactivated or blocked until a user gains access to the interactive content title (e.g., purchases, redeems a promo code, etc.). For example, a user may watch a limited version of the media content (e.g., demo, trailer, or test media content) and may access one gameplay scene of the interactive title, but may be blocked from accessing further media content and gameplay scenes until the user has purchased or otherwise gained access to the interactive title.

The media content scene list 302 may be organized and displayed by each chapter and sub-chapter. Each media content scene may correspond to one of the at least one or more trigger points, though in other examples some or none of the media content scenes of the media content scene list 302 may correspond to the at least one or more trigger points. In other words, a media content scene may correspond to a trigger point or a media content scene may not correspond to a trigger point. Selection of a media content scene may begin streaming the media content at the selected media content scene.

As shown in FIG. 4, streaming media content may include standard streaming information such as an elapsed time 402 of the media content scene and a total time 404 of the media content scene and user controls such as pause, resume streaming, move to a previous trigger point 406, move to a next trigger point 408, or play trigger point 410. Selection of the play trigger point 410 may launch the gameplay as described above relative to FIG. 2. The user interface 400 may also show a timeline 412 of the media content scene and the user may select any portion of the timeline for viewing. One or more trigger points 414 available for gameplay may also be displayed on the timeline 412. As previously described, such trigger point 414 may be provided by a user save point or predetermined by a platform, publisher, or third party publisher. The user may advance or skip to any of the trigger points 414 displayed. Each of the one or more trigger points 414 may be displayed in different colors, highlighted, or shapes based on a type of the trigger point 414. The trigger point 414 may indicate that branching media content or an important event may occur at such trigger point 414 and may be displayed in a different color or shape or highlighted differently from the other trigger points 414. For example, a highlighted and glowing trigger point 414 may indicate that the user can select one of a plurality of branching media content, otherwise an automatic selection may occur. In other examples, a red trigger point 414 may indicate that a final boss battle may occur.

The systems and methods provided for launching gameplay from streaming content provides a unique user experience for consumption of media content with interactive gameplay. Such interactive media content may allow a user to view media content in a conventional manner while being able to begin gameplay at any media content scene or any predetermined media content scene. As such, users can experience an engaging storyline of an interactive title without having to play through the entire interactive title. Rather, users can selectively play portions of the interactive title while still experiencing the storyline. Further, users who have already played through the entire game can also selectively play through the interactive title. For example, a user can play their favorite media content scenes while re-watching the story. Thus, a unique user experience of interactive streaming media content is provided.

Figure 5:
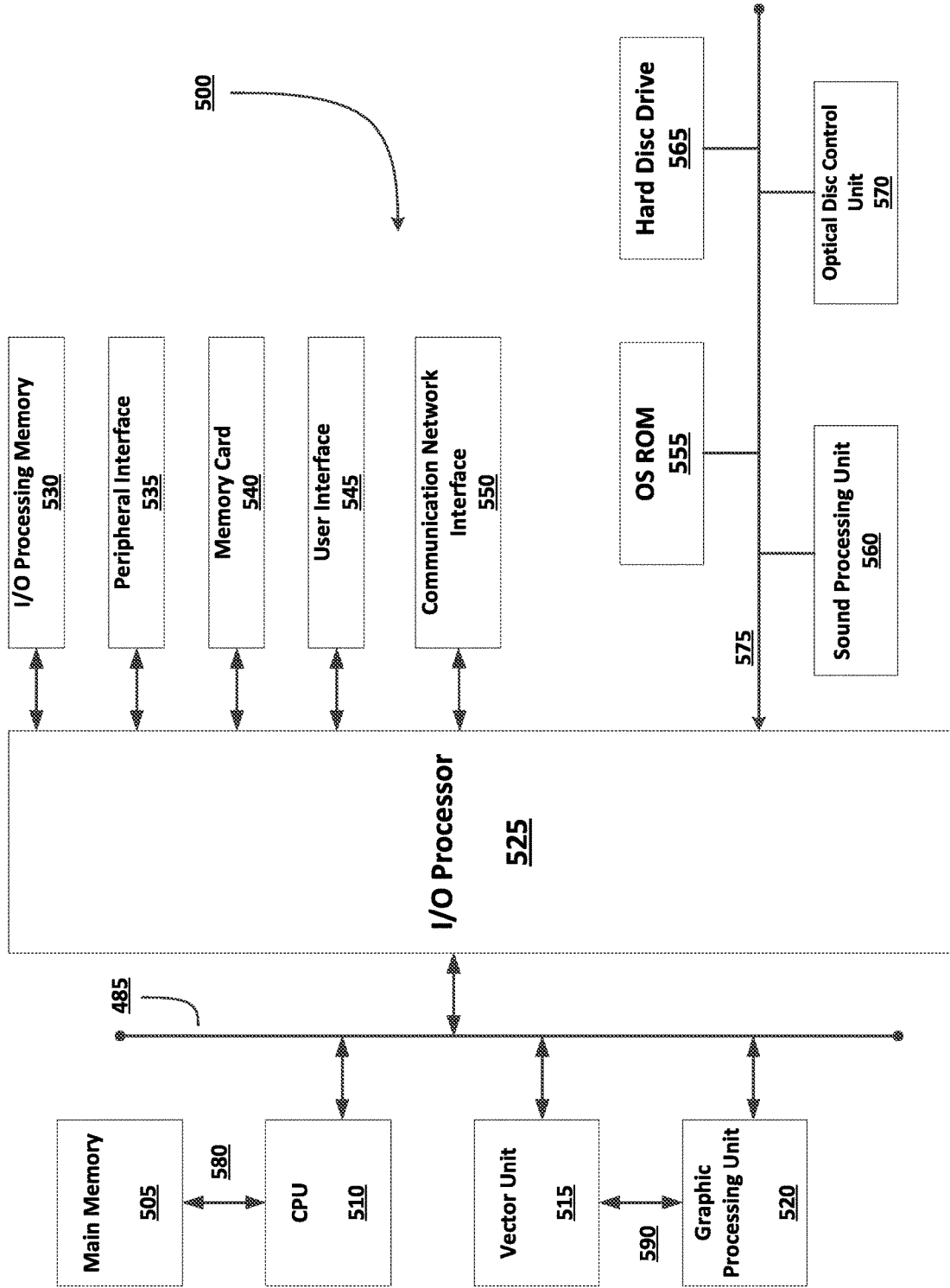
FIG. 5 is an exemplary electronic entertainment system that may be used in launching gameplay from streaming content.

FIG. 5 is an exemplary user electronic entertainment system that may be used in launching gameplay from streaming content. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for launching gameplay from streaming content, the method comprising:
   storing information regarding a plurality of media content streams in memory, each media content stream having one or more trigger points, each trigger point associated with a set of game data specific to a gameplay scene within an associated interactive title that includes a plurality of different gameplay scenes, wherein each media content stream depicts one or more players playing the interactive title in the specific gameplay scene;
   monitoring a portion of one of the media content streams that is being streamed over a communication network to a user device, wherein the streamed portion depicts an identified one of the different gameplay scenes of the interactive title;
   receiving a selection of one of the trigger points during streaming of the streamed portion by the user device, the selection received over the communication network from the user device;
   identifying that the selected trigger point is associated with the identified gameplay scene of the interactive title;
   retrieving the set of game data that is specific to the identified gameplay scene; and
   launching the interactive title for gameplay by the user device based on the retrieved set of game data specific to the identified gameplay scene depicted in the streamed portion.

2. The method of claim 1, wherein receiving the selection of the selected trigger point comprises receiving input during the streaming of the media content stream at the user device, the input specifying a media location associated with the selected trigger point.

3. The method of claim 2, wherein identifying that the identified gameplay scene is associated with the selected trigger point comprises matching the media location of the selected trigger point to a corresponding gameplay location of the gameplay scene within the interactive title.

4. The method of claim 3, wherein the interactive title is launched at the matched gameplay location.

5. The method of claim 3, wherein matching the media location to the gameplay location includes matching a timestamp of the media location to a timestamp of the gameplay location.

6. The method of claim 3, further comprising:
   identifying an end gameplay location of the gameplay;
   matching the end gameplay location to another media location; and
   allowing the user device to resume streaming of the media content stream at the another media location.

7. The method of claim 3, further comprising allowing the user device to resume streaming of the media content stream at another media location based on a game-state status.

8. The method of claim 1, further comprising generating a display of a timeline of the media content stream, wherein the trigger points are displayed within the timeline.

9. The method of claim 1, wherein at least one of the trigger points is based on user gameplay data captured at a save point in the interactive title.

10. The method of claim 1, wherein the retrieved set of game data includes status data regarding a game character depicted within the identified gameplay scene.

11. The method of claim 10, wherein the game character status data defines at least one of a skill level, gear, and items of the game character within the identified gameplay scene.

12. The method of claim 1, wherein the retrieved set of game data includes an activity identifier associated with an activity depicted within the identified gameplay scene.

13. The method of claim 12, wherein launching the interactive title includes launching the activity associated with the activity identifier.

14. The method of claim 1, wherein the streamed portion further includes a notification that is displayed when play of the streamed portion reaches one of the trigger points.

15. The method of claim 1, further comprising blocking one or more of the trigger points based on a user of the user device having access to the interactive title.

16. A system for launching gameplay from streaming content, the system comprising:
   memory that stores information regarding a plurality of media content streams, each media content stream having one or more trigger points, each trigger point associated with a set of game data specific to a gameplay scene within an associated interactive title that includes a plurality of different gameplay scenes, wherein each media content stream depicts one or more players playing the interactive title in the specific gameplay scene;

a communication interface that communicates over a communication network, wherein the communication interface:

monitors a portion of one of the media content streams that is being streamed over the communication network to a user device, wherein the streamed portion depicts an identified one of the different gameplay scenes of the interactive title, and receives a selection of one of the trigger points during streaming of the streamed portion by the user device, the selection received over the communication network from the user device; and a processor that executes instructions stored in the memory, wherein execution of the instructions by the processor:

identifies that the selected trigger point is associated with the identified gameplay scene of the interactive title;

retrieves the set of game data that is specific to the identified gameplay scene; and launches the interactive title for gameplay by the user device based on the retrieved set of game data specific to the identified gameplay scene depicted in the streamed portion.

17. The system of claim 16, wherein receiving the selection of the selected trigger point comprises receiving input during the streaming of the media content stream at the user device, the input specifying a media location associated with the selected trigger point.

18. The system of claim 17, wherein identifying the identified gameplay scene associated with the selected trigger point comprises matching the media location of the selected trigger point to a corresponding gameplay location of the gameplay scene within the interactive title.

19. The system of claim 18, wherein the interactive title is launched at the matched gameplay location.

20. The system of claim 18, wherein matching the media location to the gameplay location includes matching a timestamp of the media location to a timestamp of the gameplay location.

21. The system of claim 18, wherein execution of the instructions by the processor further:

identifies an end gameplay location of the gameplay;
matches the end gameplay location to another media location; and
allows the user device to resume streaming of the media content stream at the another media location.

22. The system of claim 18, wherein execution of the instructions by the processor further allows the user device to resume streaming of the media content stream at another media location based on a game-state status.

23. The system of claim 16, wherein execution of the instructions by the processor further generates a display of a timeline of the media content stream, wherein the trigger points are displayed within the timeline.

24. The system of claim 16, wherein at least one of the trigger points is based on user gameplay data captured at a save point in the interactive title.

25. The system of claim 16, wherein the identified set of game data includes status data regarding a game character depicted within the identified gameplay scene.

26. The system of claim 25, wherein the game character status data defines at least one of a skill level, gear, and items of the game character within the identified gameplay scene.

27. The system of claim 16, wherein the retrieved set of game data includes an activity identifier associated with an activity depicted within the identified gameplay scene.

28. The system of claim 27, wherein launching the interactive title includes launching the activity associated with the activity identifier.

29. The system of claim 16, wherein streamed portion further includes a notification that is displayed when play of the streamed portion reaches one of the trigger points.

30. A non-transitory, computer-readable storage medium having embodied thereon instructions executable by a processor to perform a method for launching gameplay from streaming content, the method comprising:

storing information regarding a plurality of media content streams in memory, each media content stream having one or more trigger points, each trigger point associated with a set of game data specific to a gameplay scene within an associated interactive title that includes a plurality of different gameplay scenes, wherein each media content stream depicts one or more players playing the interactive title in the specific gameplay scene;

monitoring a portion of one of the media content streams that is being streamed over a communication network to a user device, wherein the streamed portion depicts an identified one of the different gameplay scenes of the interactive title;

receiving a selection of one of the trigger points during streaming of the streamed portion by the user device, the selection received over the communication network from the user device;

identifying that the selected trigger point is associated with the identified gameplay scene of the interactive title;

retrieving the set of game data that is specific to the identified gameplay scene; and launching the interactive title for gameplay by the user device based on the retrieved set of game data specific to the identified gameplay scene depicted in the streamed portion.

* * * * *